United States Patent [19]

Kobayashi et al.

[11] 4,199,254
[45] Apr. 22, 1980

[54] METHOD OF MEASURING THE QUANTITY OF MOVEMENT OF AN OBJECT

[75] Inventors: Akira Kobayashi, Konandai Jutaku No. 14-503, No. 856-3, Hino-cho, Konan-ku, Yokohama-shi, Kanagawa, Japan; Susumu Ihara, Osaka, Japan

[73] Assignees: Sumitomo Electric Industries, Ltd., Osaka; Akira Kobayashi, Yokohama; Keisoku Giken Co., Ltd., Yokohama, all of Japan

[21] Appl. No.: 908,613

[22] Filed: May 23, 1978

[30] Foreign Application Priority Data

May 23, 1977 [JP] Japan ................................. 52/59534

[51] Int. Cl.² ............................................. G01P 3/36
[52] U.S. Cl. ...................................... 356/28; 356/373
[58] Field of Search ............... 356/28, 28.5, 373, 375, 356/429; 250/223 R, 561

[56] References Cited

U.S. PATENT DOCUMENTS

| | | | |
|---|---|---|---|
| 3,508,066 | 4/1970 | Agar | 356/28 |
| 3,953,126 | 4/1976 | Kim et al. | 356/28 |
| 3,994,583 | 11/1976 | Hutchins | 356/28 |

Primary Examiner—S. C. Buczinski
Attorney, Agent, or Firm—Sughrue, Rothwell, Mion, Zinn and Macpeak

[57] ABSTRACT

The accuracy of an optical measuring system is improved by directing a parallel light beam across the surface of a moving object in a direction perpendicular to the direction of movement so that movement of the object in the direction of the light beam will not affect the measurement accuracy. For measurement purposes, the silhouette of the object can be roughened by coating with an easily removable foreign substance such as wheat flour.

11 Claims, 15 Drawing Figures

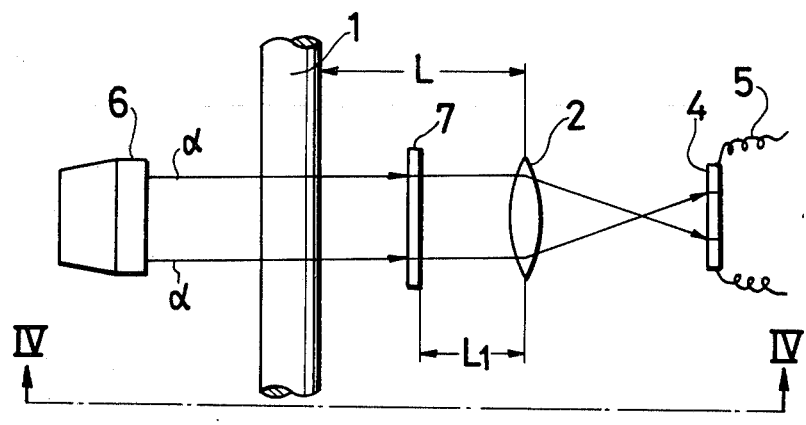
FIG.3
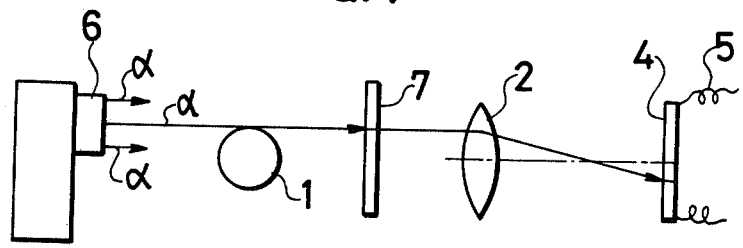
FIG.4
FIG.5 FIG.6
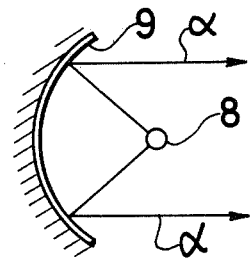 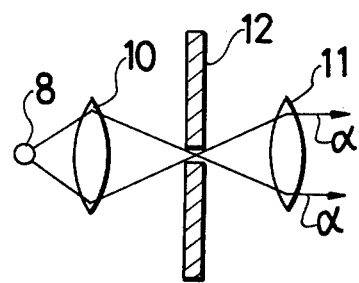

METHOD OF MEASURING THE QUANTITY OF MOVEMENT OF AN OBJECT

BACKGROUND OF THE INVENTION

This invention relates to a method of measuring the velocity and distance of movement of an object indirectly (or contactlessly) with high accuracy.

It is industrially essential to measure the quantity of movement of a moving object, such as a steel plate, a steel wire or an electric wire, with respect to both its velocity and distance with high accuracy. In this case, in general, the measurement must be carried out indirectly, or without contacting the object, because of the temperature or configuration of the object. In a conventional method of this type, a spatial filter is employed. For instance, as shown in FIG. 1, the optical irregularity of the surface of an object 1 which is moving at a velocity V is optically projected, for instance by reflection, through a lens 2 onto a spatial filter 4 in which slit-shaped photocells 3 are arranged in the movement direction of the object 1. The surface irregularity is converted into an electrical signal in the spatial filter 4, and the output signal of the latter is applied through lead wires 5 to a measuring means (not shown) thereby to measure the quantity of movement of the object. That is, the output signal of the spatial filter 4 is a composite current whose intensity is varied whenever the image of the moving object 1 projected onto the spatial filter 4 passes one period of the slit train of the photocells 3 and, accordingly, an output frequency proportional to the movement velocity of the object can be obtained from this output signal. If it is assumed that the optical system's magnification is 1/m, the period of the slit train of the photocells 3 is p, and the output frequency is f, then the movement velocity V of the object can be expressed by $V = mpf$. Furthermore, the distance of movement of the object 1 can be expressed by the time-integration value of the movement velocity V of the object 1, that is, the integration value of the output frequency f of the spatial filter 4.

In the above-described conventional method, in order to measure the quantity of movement of the object with high accuracy, it is absolutely necessary to maintain the lens system's magnification 1/m unchanged, or to maintain the distance between the moving object 1 and the lens 2 constant; however, it is very difficult to do so according to present techniques. For instance, in the case where the moving object 1 is an electric wire which is moved at a certain velocity Va as shown in FIG. 2, it is liable to vibrate vertically and horizontally, that is, the distance L between the lens 2 and the moving object 1 is often varied. Furthermore, in some manufacturing processes, it is necessary to measure the quantity of movement of an object (not shown) which is not uniform in configuration and size. In these cases, it is almost impossible to maintain the lens system's magnification constant. Thus, heretofore, it has been impossible to measure the quantity of movement of a moving object with high accuracy.

SUMMARY OF THE INVENTION

Accordingly, an object of this invention is to maintain the lens system's magnification constant with respect to a moving object. Briefly, this is accomplished by using as a measurement beam a parallel light beam directed across the surface of the moving object in a direction perpendicular to the direction of movement to form an image of the profile of the object on an optical medium adjacent the object. Since a parallel light beam is used, movement of the object in a direction parallel to the beam will have no effect on the image formed at the optical medium and, since the spatial filter derives its signal from the optical medium, the accuracy of the measurement system is improved. When measuring very smooth objects, the profile can be roughened for accurate measurement by depositing thereon an easily removable foreign material, e.g., wheat flour.

BRIEF DESCRIPTION OF THE DRAWINGS

FIG. 3 is a plan view, schematically shown, of one embodiment of the present invention.

FIG. 4 is a view along the line IV—IV of FIG. 3.

FIGS. 5 and 6 are explanatory diagrams for a description of suitable parallel light beam sources.

DETAILED DESCRIPTION OF THE INVENTION

FIGS. 3 and 4 are explanatory diagrams showing one embodiment of the invention. More specifically, FIG. 3 is a plan view showing essential parts of the embodiment, while FIG. 4 is a side view showing the essential parts illustrated in FIG. 3.

Figure 1:
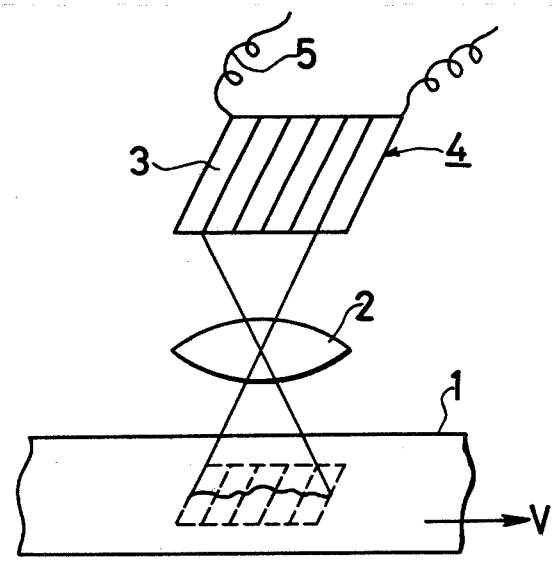
FIGS. 1 and 2 are schematic diagrams of a description of a conventional method of measuring the quantity of movement of a moving object.
Figure 7:
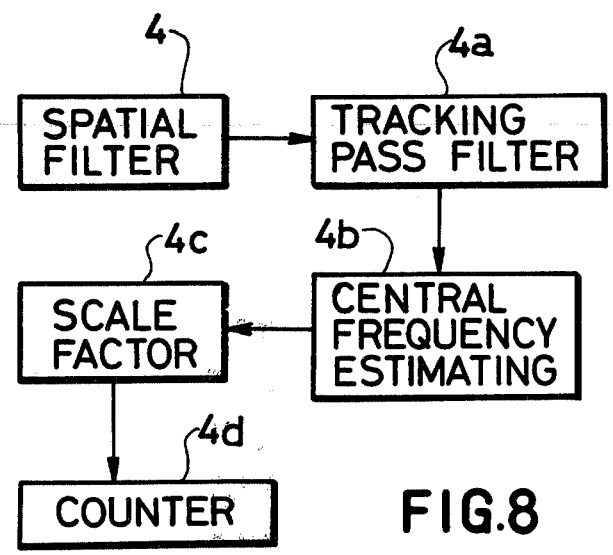
FIG. 7 is a block diagram illustrating a signal process circuit.

As shown in FIGS. 3 and 4, a light source 6 adapted to emit a parallel light beam α perpendicularly to a moving object 1 is provided. Furthermore, an optical medium 7 such as a ground glass plate and a spatial filter 4 are arranged, in the stated order, in the irradiation direction of the light source 6. The optical medium 7 is obtained by grinding a quartz glass plate or a plastic plate. In the spatial filter 4, slit-shaped photocells are arranged in parallel in the movement direction of the moving object 1, similarly as in the case of FIG. 1. The light beam of the light source 6 is obtained by reflecting the light beams from a luminous element 8 by a concave mirror 9, as shown in FIG. 5. However, the light source may be such that, as shown in FIG. 6, the light emission of the luminous element is passed by an optical system in which a slit plate 12 is positioned at the common focal point of two lenses 10 and 11. In the embodiment, the upper end surface of the moving object 1 is irradiated by the parallel light beam α of the light source thus formed; however it is obvious that the optical system may be so arranged as to irradiate the lower end surface or both of the upper and lower end surfaces. Furthermore, it is not always necessary to irradiate the moving object 1 perpendicularly to its movement direction; that is, all that is necessary is to apply the parallel beam in such a manner as to cross the moving object. The parallel light beam α is applied to the moving object 1 to project the silhouette of the moving object 1 onto the optical medium 7, and the projection image on the optical medium 7 is projected through the lens 2 onto the spatial filter 4. Accordingly, in this case, even if the distance between the moving object 1 and the lens 2 is changed because of the vibration of the object or the irregularity in size and configuration of the object, the image projected on the optical medium 7 is coincident in size with the moving object 1 because the image is obtained by the parallel light beam and movement of the object 1 parallel to the light beam will not change the size of the image. Accordingly, if the distance $L_1$ between the lens 2 and the optical medium 7 is maintained constant, the magnification of the lens 2 with respect to the moving object 1 can be maintained constant. The line indicating the shape of the image projected onto the optical medium 7 varies in light quantity in correspondence to the surface irregularity of the moving object 1. Therefore, when the image projected onto the optical medium 7 is projected through the lens 2 onto the spatial filter 4, the latter outputs an electrical signal having a frequency corresponding to the surface irregularity of the moving object 1. The frequency of the output signal of the spatial filter 4 is subjected to integration in a signal processing circuit as shown in FIG. 7, to measure the quantity of movement of the moving object 1. In the block diagram of FIG. 7, reference numeral 4 designates the above-described spatial filter. The spatial filter 4 provides a random electrical signal, which is applied through a tracking pass filter 4a to a central frequency estimating circuit 4b, where the central frequency is detected by using, for instance, a self correlation coefficient. The frequency thus detected is converted into lengthwise pulses by a scale factor circuit 4c, which are counted by a counter 4d to measure the quantity of movement of the moving object.

Figure 8:
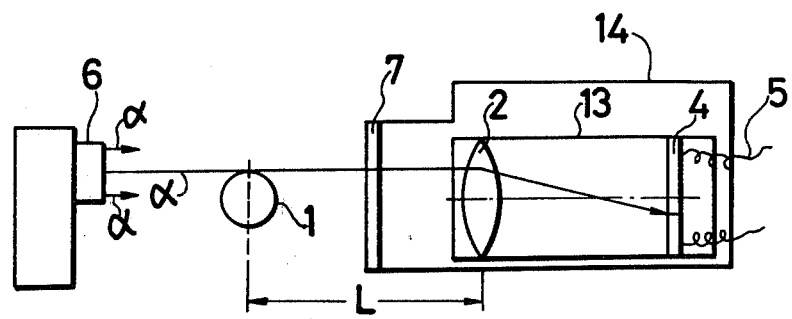
FIGS. 8 through 11 are explanatory diagrams for a description of various modifications which may be made to the method according to FIGS. 3 and 4.

FIG. 8 is a schematic diagram showing essential components of another embodiment of the invention, for a description of another method of measuring the quantity of movement of a moving object. In this embodiment, as shown in the figure, the lens 2 and the spatial filter 4 are incorporated in a housing 13, and the housing 13 is placed inside another housing 14 with the optical medium 7 at its one end, in order to protect the filter from undesired external light beams. As was described with reference to FIGS. 3 and 4, in this embodiment also, a light source 6 is arranged so as to emit a parallel light beam $\alpha$ to the moving object 1 perpendicularly to its movement direction, and in the irradiation direction of the light source 6 the optical medium 7, such as a ground glass plate onto which the silhouette of the moving object 1 is projected, and the spatial filter 4 onto which the image projected on the optical medium 7 is projected through the lens 2 are provided. Accordingly, in this case also, the magnification of the lens with respect to the moving object 1 can be maintained constant. Furthermore, as the undesired light beams are not allowed to enter the filter because of the provision of the housing 13 and 14, the measurement accuracy is considerably increased.

The following Table 1 indicates the results of measurement effected with the measuring apparatus according to this invention. In this case, the length of a moving object was measured with the apparatus constructed according to FIG. 8. The moving object 1 measured was a circular cylinder 85 mm in outside diameter and 500 mm in length, and it was moved at a velocity of 8.5 m/min. The optical medium 7 was a quartz glass plate which was ground in the form of a ground glass plate to the extent that it was impossible to see the moving object 1 through the quartz glass plate so that an image may be formed thereon. In Table 1, reference symbol $\Delta L$ represents an amount of positional variation of the moving object from a reference point of the latter, which is at a distance L from the lens 2. For instance, $-30$ mm means that the moving object is shifted 30 mm from the reference point toward the lens 2, 0 mm means tha the moving object is at the reference point, and $+30$ mm means that the moving object is 30 mm away from the reference point toward the light source 6. The measurement was repeated six times, and the data of length measured in each measurement are indicated separately according to the amounts of positional variation $\Delta L$.

Table 1

| Measurements | $\Delta L$ | Data of Length Measured (mm) | | |
|---|---|---|---|---|
| | | $-30$mm | 0mm | $+30$mm |
| 1st | | 499 | 500 | 499 |
| 2nd | | 500 | 499 | 500 |
| 3rd | | 500 | 499 | 500 |
| 3rd | | 500 | 499 | 500 |
| 4th | | 499 | 499 | 499 |
| 5th | | 500 | 500 | 499 |
| 6th | | 500 | 500 | 500 |

As is apparent from Table 1, the measured length of the moving object was 500 mm or 499 mm in the case where the moving object was at the reference point and also in the case where it was at the position of $\Delta L = \pm 30$ mm. Thus, if the present invention is employed for measuring a moving object, the measurement error is considerably small not matter how the position of the moving object is varied.

Figure 2:
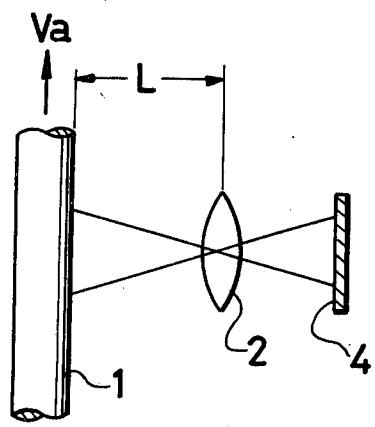

For comparison, the length of the same moving object was measured according to the conventional method, which employed an apparatus constructed according to FIG. 2. The measurement results are as indicated in Table 2 below:

Table 2

| Measurement | $\Delta L$ | Data of Length Measured (mm) | | |
|---|---|---|---|---|
| | | $-30$mm | 0mm | $+30$mm |
| 1st | | 513 | 500 | 484 |
| 2nd | | 512 | 499 | 485 |
| 3rd | | 513 | 499 | 484 |
| 4th | | 512 | 500 | 484 |
| 5th | | 512 | 499 | 484 |
| 6th | | 513 | 500 | 485 |

As is clear from Table 2, when the moving object passed through the reference point, the measured length was 500 mm or 499 mm; that its error was very small. However, when the moving object passed through the position $\Delta L = -30$ mm, the measured length was 512 mm or 513 mm; and when the moving object passed through the position $L = +30$ mm, the measured length was 485 or 484 mm. Thus, in the application of the conventional method, the measurement error is greatly increased when the position of the moving object is changed.

Figure 9:
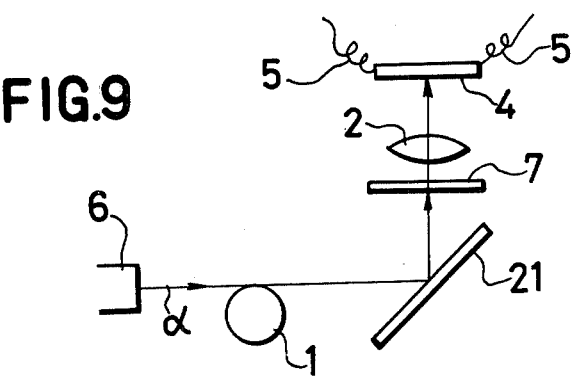
Figure 10:
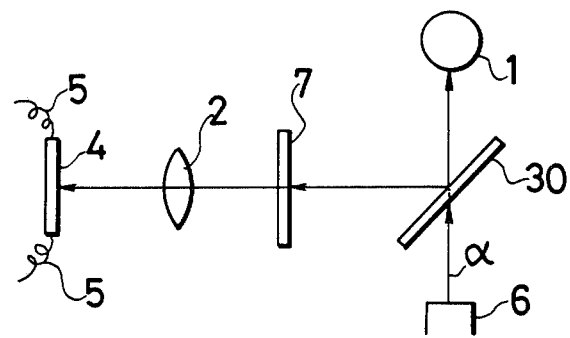

In the above-described embodiments, the silhouette of an moving object 1 is projected directly onto the optical medium 7. However, it is possible that, as shown in FIG. 9, the parallel light beam from the light source 6 is applied to the moving object 1, so that the silhouette of the moving object 1 is reflected by a mirror 21 to thereby be projected onto the optical medium 7. Furthermore, it is possible that, as shown in FIG. 10, the parallel light beam from the light source 6 is allowed to irradiate the moving object through a half-mirror 30, so that the silhouette of the moving object 1 is reflected by the half-mirror 30 to thereby be projected onto the optical medium 7. In these cases, the silhouette of the moving object 1 is projected indirectly onto the optical medium 7; however, if the distance between the optical medium 7 and the lens 2 is maintained unchanged at all times, then it is possible to maintain the magnification of the lens 2 with respect to the moving object 1 constant.

Figure 11:
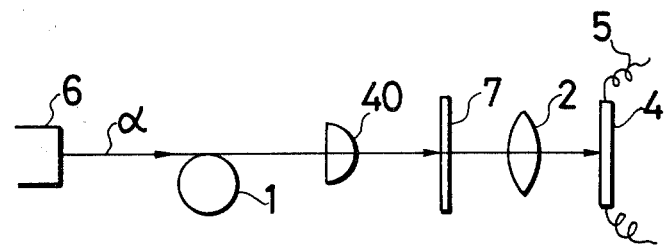
Figure 12A:
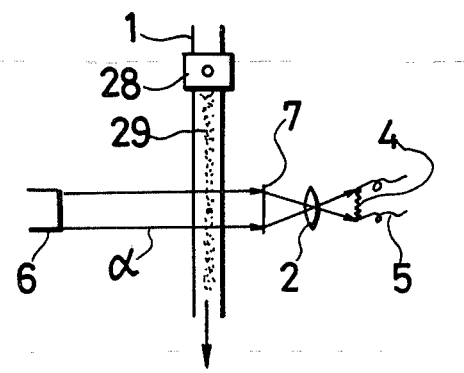
FIGS. 12(A) through 12(C) and 13 are diagrams for a description of methods for artificially roughening the surface of a smooth object measured by the method according to the present invention.
Figure 12B:
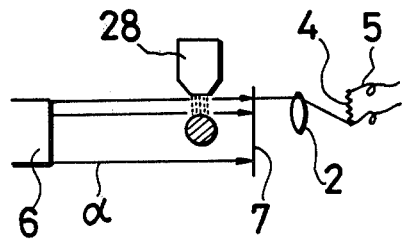
Figure 12C:
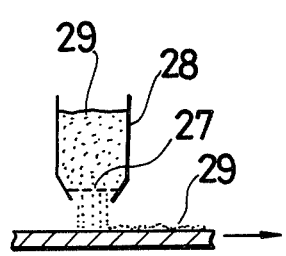

In addition, in the case where the surface of moving object is smooth, the following method is effective. In this method, as shown in FIG. 11, a cylindrical lens 40 is disposed between the moving object 1 and the optical medium 7, so that the irregularity of the moving object is optically enlarged, and the irregularity thus enlarged is projected on the optical medium 7. In FIGS. 9 through 11, those components which have been previously described with reference to FIGS. 3 and 4 are designated by like reference numerals.

Now, the measurement in the case where the surface of a moving object is smooth will be described in more detail.

In the case where the surface of a moving object is rough, the measurement can be achieved with high accuracy. However, it has been found that in the case of a cable which is covered with polyethylene or vinyl chloride, or an aluminum pipe, it is difficult to clearly obtain an electrical signal and, accordingly, it is difficult to obtain the measurement result with high accuracy. Accordingly, based on the fact that a moving object having a rough surface can be measured with high accuracy from its output electrical signal, the smooth surface of a moving object is made rough temporarily to obtain a clear electrical signal for measurement in the following embodiment of the invention.

This embodiment will be described with reference to FIGS. 12(A) through 12(C) and 13. The parallel beam $\alpha$ from a light source 6 is applied to a moving object 1 to form its image on an optical medium 7 such as a ground glass plate, and the image thus formed is formed on a grid-shaped photocell means, or a filter 4, with the aid of a lens 2, so that an electrical signal is provided in accordance with the movement of the image formed on the filter 4. The electrical signal is counted by the counter 4d through the tracking pass filter 4a, the central frequency estimating circuit 4b and the scale factor circuit 4c as shown in FIG. 7, to thereby measure the quantity of movement of the moving object. The apparatus itself is similar to that shown in FIGS. 3 and 4; however, a powder applying device 28 for applying powder 29 such as wheat flour is provided immediately above the moving object in such a manner that the powder is applied to the moving object before it reaches the parallel beam. A fine mesh metal net 27 is provided in the vicinity of the outlet of the powder applying device 28. As the device 28 is vibrated by a vibrator (not shown), the powder 29 is allowed to uniformly drop onto the surface of the moving object 1. After the powder 29 passed through the parallel light beam $\alpha$, it is removed from the moving object by using a powder removing device (not shown) such as an electrical vacuum cleaner. Thus, the measurement accuracy is significantly improved by temporarily making the surface of the moving object rough.

Table 3 indicates the measurement accuracy in the case where the moving object 1 was an aluminum pipe and powder (wheat flour) was applied to the surface thereof, and the measurement accuracy in the case where the moving object 1 was the same aluminum pipe and no powder was applied to the surface thereof. In the case of the embodiment of this invention, the signal component was clearly provided, which led to an average value $\overline{X}=364.67$ mm and to a very small deviation value $\sigma_{n-1}/\overline{X}=0.18$ mm. On the other hand, in the case where the powder application was not employed, the average value $\overline{X}$ was 250.00 mm being greatly different from the average value X=364.67 mm, and the deviation value $\sigma_{n-1}/\overline{X}=65.80$ mm being unevenly distributed. The reason for this resides in that it was necessary to increase the sensitivity and, accordingly, a lot of noise components were included in the output waveform.

Table 3

|  | The invention is not applied. Data obtained when the aluminum pipe was measured in the parallel beam system. (n=21) | | | The invention is applied. Data obtained when powder (wheat flour) is applied to the aluminum pipe. (n=21) | | |
|---|---|---|---|---|---|---|
| Measurement Data | 292(mm) | 34 | 279 | 366 | 365 | 365 |
|  | 401 | 408 | 64 | 365 | 366 | 364 |
|  | 400 | 44 | 19 | 365 | 364 | 364 |
|  | 410 | 396 | 39 | 364 | 365 | 365 |
|  | 414 | 406 | 385 | 364 | 365 | 364 |
|  | 143 | 252 | 402 | 364 | 364 | 365 |
|  | 402 | 57 | 62 | 365 | 364 | 365 |
| Average Values $\overline{X}$ (mm) |  | 252.81 |  |  | 364.67 |  |
| Deviation Value $\dfrac{\sigma_{n-1}}{\overline{X}} \times 100\ (\%)$ |  | 65.80 |  |  | 0.18 |  |

Figure 13:
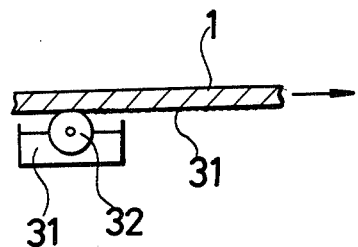

Instead of the powder 29, a viscous material 31 such as grease having a relatively high viscosity may be employed. In this case, the viscous material may be applied to the moving object 1 with a roller 32 as shown in FIG. 13. However, the viscous material should be such that when it passes through the parallel beam $\alpha$, the surface of the viscous material is not made smooth because of its surface tension. After the viscous material passes through the parallel beam, it may be wiped off.

As is clear from the above description, in the method of measuring the quantity of movement of a moving object according to this invention, a parallel light beam is allowed to irradiate the moving object to project the silhouette of the moving object onto an optical medium such as a ground glass plate, the image formed on the optical medium is projected onto a spatial filter, which outputs an electrical signal having a frequency corresponding to the quantity of incident light, and the frequency of the output signal is subjected to integration in a signal process circuit, to thereby measure the quantity of movement of the moving object. Therefore, even if the moving object is vibrated, or it is uneven in configuration or in size, the magnification of the lens with respect to the moving object can be made constant at all times. In the case of measuring a moving object whose surface is smooth, the surface itself is not made rough, but the surface is made apparently rough by temporarily applying powder or viscous material thereto. That is, the surface of the moving object is temporarily made rough without lowering the quality in a very simple manner, thus considerably increasing the measurement accuracy. It will be obvious that although the embodiments have been described with reference to distance measurement only, the velocity of the object 1 could be obtained by simply dividing by the time required for the measurement in a manner well known in the art. The advantages of this invention should be greatly appreciated.

What is claimed is:

1. A method of measuring the quantity of movement of a moving object, of the type in which the surface irregularity of the moving object is projected through an optical system onto an optical detection device, wherein the improvement comprises:
   directing a parallel light beam across the surface of said moving object to form an image of the silhouette thereof on a transmissive optical medium positioned in the optical path between said moving object and said optical system and at a fixed distance from said optical system, whereby the magnification of the image projected by said optical system is unaffected by movements of the object in a direction parallel to said light beam.

2. A method according to claim 1, wherein said light beam is directed at said object in a direction perpendicular to the direction of movement thereof.

3. A method according to claim 1, further comprising: enlarging said image by means of an optical element disposed between said object and said optical medium.

4. A method according to claim 3, wherein said optical element is a cylindrical lens.

5. A method as claimed in claims 1, 2 or 3, in which a rough surface is formed on the smooth surface of said moving object.

6. A method as claimed in claim 5, in which said rough surface is obtained by dropping a powder-like material onto said moving object along the longitudinal direction thereof.

7. A method as claimed in claim 5, in which said rough surface is obtained by coating with a viscous material the moving object along the longitudinal direction thereof.

8. A method according to claim 1 further comprising maintaining said optical system at a fixed distance from said optical detection device.

9. In an apparatus for optically measuring the linear velocity of an object moving in a given direction by projecting a silhouette of the object upon a photoelectric transducer to produce electric signals indicative of the velocity, the improvement comprising:
   means for directing a parallel light beam in a path across the moving object and in the direction towards said transducers;
   transmissive optical medium means disposed in said path for forming thereon an image of said silhouette; and
   lens means disposed in said path between said optical medium means and said photoelectric transducer means for projecting the image on said medium onto said photoelectric transducer, the distance between said optical medium means and said lens being fixed so that the magnification of the projected image is unaffected by movement of the object in a direction parallel to the light beam.

10. The improvement as claimed in claim 9 wherein said optical medium means comprises a ground glass plate.

11. The improvement claimed in claim 9 wherein said photoelectrical transducer comprises a spatial filter for providing an electric signal corresponding to the quantity of light incident thereon.

* * * * *